United States Patent
Gao et al.

(10) Patent No.: US 10,564,472 B2
(45) Date of Patent: Feb. 18, 2020

(54) BACKLIGHT AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Gao, Beijing (CN); Xue Dong, Beijing (CN); Xiaochuan Chen, Beijing (CN); Wenqing Zhao, Beijing (CN); Pengcheng Lu, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 15/520,340

(22) PCT Filed: Aug. 30, 2016

(86) PCT No.: PCT/CN2016/097277
§ 371 (c)(1),
(2) Date: Apr. 19, 2017

(87) PCT Pub. No.: WO2017/118056
PCT Pub. Date: Jul. 13, 2017

(65) Prior Publication Data
US 2018/0107066 A1    Apr. 19, 2018

(30) Foreign Application Priority Data

Jan. 8, 2016 (CN) .......................... 2016 1 0013110

(51) Int. Cl.
*G02F 1/1335* (2006.01)
*G02B 27/10* (2006.01)
(Continued)

(52) U.S. Cl.
CPC ... *G02F 1/133606* (2013.01); *G02B 27/1006* (2013.01); *G02B 27/12* (2013.01);
(Continued)

(58) Field of Classification Search
CPC ......... G02F 1/133606; G02F 1/133621; G02F 1/1323; G02F 1/1334; G02F 1/133603;
(Continued)

(56) References Cited

U.S. PATENT DOCUMENTS 7,164,454 B2 *   1/2007   Numata .............. G02B 6/0053
                                                         349/57
2007/0040975 A1   2/2007   Momoi
(Continued)

FOREIGN PATENT DOCUMENTS

CN         1916705 A      2/2007
CN        101625458 A     1/2010
(Continued)

OTHER PUBLICATIONS

International Search report dated Dec. 8, 2016 in corresponding International Application No. PCT/CN2016/097277 along with the English translation of form PCT/ISA/210 and form PCT/ISA/237.

*Primary Examiner* — Charles S Chang
(74) *Attorney, Agent, or Firm* — Nath, Goldberg & Meyer; Joshua B. Goldberg

(57) ABSTRACT

The present application discloses a backlight comprising a surface light source and a beam splitting film provided on a light-exiting surface of the surface light source. A beam splitting structure is provided on a surface of the beam splitting film distal to the surface light source, and the (Continued)

surface of beam splitting film distal to the surface light source is divided into a plurality of beam splitting units. The beam splitting structure in each of the plurality of beam splitting units is capable of splitting light entering a surface of the beam splitting film proximal to the surface light source into at least three light beams each having a different emergent direction and a different wavelength. The present application also discloses a display apparatus having the backlight.

17 Claims, 3 Drawing Sheets

(51) Int. Cl.
    *G02B 27/12*     (2006.01)
    *G02F 1/13*     (2006.01)
    *G02F 1/1334*     (2006.01)
    *G02B 5/02*     (2006.01)

(52) U.S. Cl.
    CPC .......... *G02F 1/1323* (2013.01); *G02F 1/1334* (2013.01); *G02F 1/133603* (2013.01); *G02F 1/133608* (2013.01); *G02F 1/133621* (2013.01); *G02B 5/0231* (2013.01); *G02F 2001/133607* (2013.01)

(58) Field of Classification Search
    CPC ... G02F 1/133608; G02F 2001/133607; G02B 27/1006; G02B 27/12; G02B 5/0231
    USPC .......................................................... 349/63
    See application file for complete search history.

(56) References Cited

U.S. PATENT DOCUMENTS

| | | | | |
|---|---|---|---|---|
| 2009/0161213 A1* | 6/2009 | Lin | ....................... | G02B 3/0068 |
| | | | | 359/485.01 |
| 2010/0097409 A1* | 4/2010 | Miyasaka | ............. | G02F 1/1323 |
| | | | | 345/690 |
| 2011/0141395 A1* | 6/2011 | Yashiro | ................ | G02B 6/0036 |
| | | | | 349/62 |
| 2011/0216266 A1* | 9/2011 | Travis | ....................... | F21V 7/22 |
| | | | | 349/62 |
| 2014/0347600 A1* | 11/2014 | Yun | ....................... | G02B 6/0055 |
| | | | | 349/62 |

FOREIGN PATENT DOCUMENTS

| | | |
|---|---|---|
| CN | 101676771 A | 3/2010 |
| CN | 103487983 A | 1/2014 |
| JP | 11-313334 A | 11/1999 |
| JP | 2008-102236 A | 5/2008 |
| JP | 2012-118456 A | 6/2012 |

\* cited by examiner

BACKLIGHT AND DISPLAY APPARATUS

This is a National Phase Application filed under 35 U.S.C. 371 as a national stage of PCT/CN2016/097277, filed Aug. 30, 2016, an application claiming the benefit of Chinese Application No. 201610013110.0, filed Jan. 8, 2016, the content of each of which is hereby incorporated by reference in its entirety.

FIELD

The present invention relates to the field of display technology, and particularly to a backlight and a display apparatus having the backlight.

BACKGROUND

FIG. 1 is a schematic sectional view of an existing liquid crystal apparatus. As shown in FIG. 1, the liquid crystal apparatus includes a backlight 1, an array substrate 2, a counter substrate 4, and a liquid crystal layer 3 encapsulated between the array substrate 2 and the counter substrate 4. The counter substrate 4 is provided with a color filter film thereon, and as shown in FIG. 1, the color filter film includes color filter blocks of three colors, namely, a red color filter block R, a green color filter block G, and a blue color filter block B.

However, this liquid crystal apparatus has high power consumption. Thus, how to reduce the power consumption of the liquid crystal apparatus has become a technical issue to be solved urgently in the art.

SUMMARY

An object of the present invention is to provide a backlight and a display apparatus having the backlight. The backlight and the display apparatus have lower power consumption.

As an aspect of the present invention, there is provided a backlight including a surface light source and a beam splitting film provided on a light-exiting surface of the surface light source, wherein a beam splitting structure is provided on a surface of the beam splitting film distal to the surface light source, and the surface of the beam splitting film distal to the surface light source is divided into a plurality of beam splitting units; and the beam splitting structure in each of the plurality of beam splitting units is capable of splitting light entering a surface of the beam splitting film proximal to the surface light source into at least three light beams each having a different emergent direction and a different wavelength.

In some embodiments, the beam splitting film includes a beam splitting film body and the beam splitting structure, the beam splitting structure being on a side of the beam splitting film body distal to the surface light source; the beam splitting unit includes a plurality of beam splitting sub-units, each of which corresponds to light of a wavelength and includes a plurality of beam splitting elements; each of the beam splitting elements includes a light-exiting inclined plane having an angle with respect to a surface of the beam splitting film body proximal to the surface light source, and the angle satisfies the following equation, $$\lambda = 2d \sin \gamma,$$

where $\lambda$ is a wavelength of light exiting from the light-exiting inclined plane; d is a length of orthogonal projection of the beam splitting element on the surface of the beam splitting film body proximal to the surface light source; and $\gamma$ is the angle between the light-exiting inclined plane and the surface of the beam splitting film body proximal to the surface light source.

In some embodiments, each of the beam splitting units includes three beam splitting sub-units, red, green and blue light beams exiting from the three beam splitting sub-units, respectively.

In some embodiments, the beam splitting structure and the beam splitting film body are an integral structure obtained by an integral forming process.

In some embodiments, each of the beam splitting elements has at least one dimension on nanometer scale.

In some embodiments, the light-exiting inclined planes of all beam splitting elements in a same beam splitting sub-unit are parallel to each other.

In some embodiments, the beam splitting elements are closely arranged without gaps in any two adjacent ones of the beam splitting elements.

In some embodiments, the surface light source includes a plurality of organic light-emitting diodes emitting white light.

As another aspect of the present invention, there is provided a display apparatus, including a display panel and any one of the above backlights provided by embodiments of the present invention, wherein the surface of the beam splitting film on which the beam splitting structure is provided is proximal to the display panel, and the display panel is divided into a plurality of pixel units, each of the plurality of pixel units corresponding to one of the beam splitting units.

In some embodiments, the backlight and the display panel are bonded together by a sealant surrounding the display panel.

In some embodiments, the backlight, the display panel and the sealant together form a sealed chamber.

In some embodiments, the display apparatus further includes a viewing angle control panel disposed on a light-exiting side of the display panel. In some embodiments, the viewing angle control panel includes a viewing angle control liquid crystal layer and a control module capable of providing a control voltage to the viewing angle control liquid crystal layer, and a refraction index of the viewing angle control liquid crystal layer varies with change of the control voltage.

In some embodiments, the control module is capable of providing a threshold voltage to the viewing angle control liquid crystal layer, such that the viewing angle control liquid crystal layer is in a transparent state.

In some embodiments, the control module is configured to, in a case where the viewing angle control liquid crystal layer is controlled to be in a transparent state, provide threshold voltages with opposite polarities to the viewing angle control liquid crystal layer at different times.

In some embodiments, the viewing angle control liquid crystal layer includes a polymer dispersed liquid crystal or a blue phase liquid crystal.

In the backlight provided by embodiments of the present invention, the beam splitting film can split the white light into a plurality of light beams having different colors. Thus, light beams of respective colors are emitted from the backlight without being filtered by a color filter film, so that the brightness of a display having the backlight is improved. In other words, light with desired brightness can be obtained with lower power consumption, and thus the backlight according to embodiments of the present invention is more energy efficient.

BRIEF DESCRIPTION OF THE FIGURES

The accompanying drawings, which constitute a part of the specification, are provided for further understanding of the present invention, and for explaining the present invention together with the following specific implementations, but not intended to limit the present invention. In the drawings.

DETAILED DESCRIPTION

Specific embodiments of the present disclosure will be described below in detail in conjunction with the accompanying drawings. It should be understood that the embodiments to be described herein are only intended to illustrate and explain the present disclosure, but not to limit the present disclosure.

Figure 1:
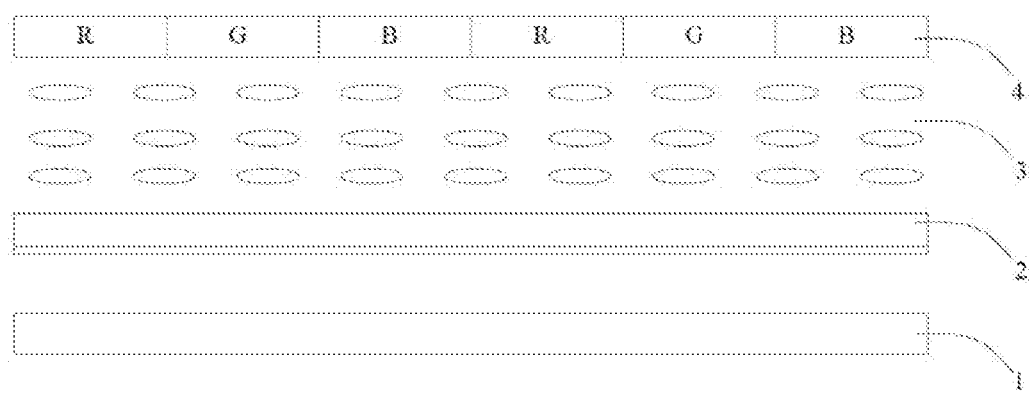
FIG. 1 is a schematic view of an existing liquid crystal display apparatus.

In an existing liquid crystal display apparatus as shown in FIG. 1, a backlight 1 emits white light. When the white light enters a red color filter block R, light with red color passes through the red color filter block R, while light with other colors are blocked; when the white light enters a green color filter block G, light with green color passes through the green color filter block G, while light with other colors are blocked; and when the white light enters a blue color filter block B, light with blue color passes through the blue color filter block B, while light with other colors are blocked. That is to say, two-thirds of the light beams are blocked when the white light enters each color filter block, and thus the brightness of display is reduced due to the use of the color filter film. In this case, it is necessary to increase the brightness of the backlight to achieve desired brightness of the display, resulting in increased power consumption. Thus, the existing display apparatus having the backlight 1 has high power consumption.

Figure 2:
FIG. 2 is a structural diagram of a backlight according to an embodiment of the present disclosure.

In view of the above problem, embodiments of the present disclosure provide a backlight, which has lower power consumption. In some embodiments, as shown in FIG. 2, a backlight 100 includes a surface light source 110 and a beam splitting film 120 provided on a light-exiting surface of the surface light source 110. A beam splitting structure is provided on a surface of the beam splitting film 120 distal to the surface light source 110, and the surface of the beam splitting film 120 distal to the surface light source 110 is divided into a plurality of beam splitting units, the beam splitting structure in each of the plurality of beam splitting units being capable of splitting light entering a surface of the beam splitting film 120 proximal to the surface light source 110 into at least three light beams each having a different emergent direction and a different wavelength.

It should be understood that, the light emitted from the surface light source 110 is white light, which is formed by combining light of different wavelengths (i.e., light with different colors), and the beam splitting film 120 is capable of splitting the white light into light beams with different wavelengths (i.e., light beams with different colors). That is, a plurality of light beams each having a different color exit from each of the beam splitting units, and each beam splitting unit corresponds to one pixel unit of a display panel. It should be understood that, each pixel unit may include a plurality of sub-pixel units, and the plurality of light beams from the beam splitting unit enter respective sub-pixel units of a corresponding pixel unit, so as to achieve color display.

In embodiments of the present disclosure, the beam splitting film of the backlight is capable of splitting the white light into a plurality of light beams having different colors, and thus light beams of respective colors are emitted from the backlight without being filtered by a color filter film, so that the brightness of a display having the backlight is improved. Under a condition of same power consumption, brightness of a display apparatus having the backlight according to embodiments of the present disclosure is approximately three times as high as that of an existing display apparatus having the structure of FIG. 1. In other words, light with desired brightness can be obtained with lower power consumption, and thus the backlight according to embodiments of the present disclosure is more energy efficient.

Figure 3:
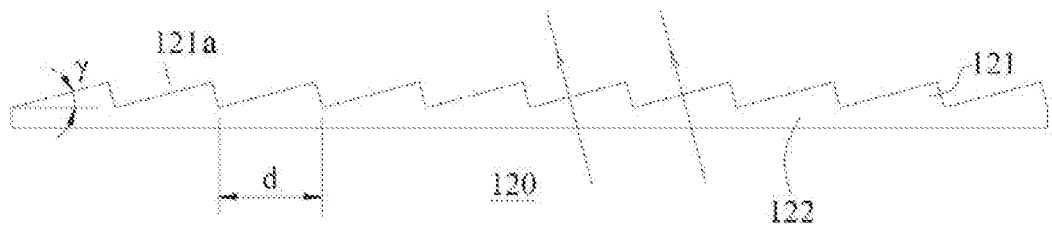
FIG. 3 is a structural diagram of a beam splitting film according to an embodiment of the present disclosure.

In the present disclosure, there is no specific limitation on the structure of the beam splitting film 120 of the backlight 100. In some embodiments, the beam splitting structure on the beam splitting film 120 may be on nanometer scale. In some embodiments, as shown in FIG. 3, the beam splitting film 120 includes a beam splitting film body 122 and a beam splitting structure on a side of the beam splitting film body 122 distal to the surface light source 110. The surface of the beam splitting film 120 distal to the surface light source 110 is divided into a plurality of beam splitting units, and each beam splitting unit includes a plurality of beam splitting sub-units, each of which corresponds to light of a wavelength. Each beam splitting sub-unit includes a plurality of beam splitting elements 121, each of which includes a light-exiting inclined plane 121a having an angle γ with respect to a surface of the beam splitting film body 122 proximal to the surface light source 110. The angle γ between the light-exiting inclined plane 121a and the surface of the beam splitting film body 122 proximal to the surface light source 110 satisfies the following equation (1):

$$\lambda = 2d \sin \gamma \qquad (1),$$

where λ is a wavelength of light exiting from the light-exiting inclined plane 121a; d is a length of orthogonal projection of the beam splitting element 121 on the surface of the beam splitting film body 122 proximal to the surface light source 110; and γ is the angle between the light-exiting inclined plane 121a and the surface of the beam splitting film body 122 proximal to the surface light source 110.

In some embodiments, the light-exiting inclined planes 121a of all beam splitting elements 121 in a same beam splitting sub-unit are parallel to each other, as shown in FIG. 3.

In some embodiments, the beam splitting element 121 is on nanometer scale (that is, the beam splitting element 121 has at least one dimension on nanometer scale), while pixel units of a display panel, in which the backlight is used, are typically on micron scale, and sub-pixel units in each pixel unit is also on micron scale. In some embodiments, each beam splitting sub-unit has plural beam splitting elements 121 to ensure the brightness of the emergent light beams having different colors, such that the desired brightness of the emergent light from the beam splitting sub-units can be guaranteed.

In some embodiments, as shown in FIG. 3, the beam splitting film 120 is in form of a blazed grating. For one beam splitting element 121, a light beam having a wavelength λ, among the incident white light on the one beam splitting element 121, may exit from the light-exiting inclined plane 121a in an enhanced manner, in a case where the angle γ between the light-exiting inclined plane 121a and the surface of the beam splitting film body 122 proximal to the surface light source satisfies the above equation (1). Thus, the light beams transmitted through the beam splitting sub-unit having the one beam splitting element 121 are each the light beam having the wavelength λ. In some embodiments, the beam splitting elements 121 of the beam splitting film 120 are closely arranged without gaps in any two adjacent beam splitting elements 121, so as to improve efficiency of beam splitting.

It should be understood that, the designer may determine the wavelength λ of the emergent light from the light-exiting inclined plane 121a of the beam splitting element 121 according to product requirements, and may determine the length d of orthogonal projection of the beam splitting element 121 on the surface of the beam splitting film body 122 proximal to the surface light source 110 according to dimensions of pixel units of a display panel to be used. When the wavelength λ of the emergent light and length d of orthogonal projection of the beam splitting element 121 on the surface of the beam splitting film body 122 proximal to the surface light source 110 are determined, the angle γ between the light-exiting inclined plane 121a and the surface of the beam splitting film body 122 proximal to the surface light source 110 can be calculated by using the above equation (1).

In some embodiments, each of the beam splitting units includes three beam splitting sub-units, red, green and blue light beams exiting from the three beam splitting sub-units, respectively.

In some embodiments, the beam splitting structure and the beam splitting film body 122 are an integral structure obtained by an integral forming process for simplicity of manufacture.

In the present disclosure, there is no specific limitation on methods of forming the beam splitting structure on the beam splitting film body 122. In some embodiments, a preliminary material layer may be formed first, the beam splitting structure is then formed on a surface of the preliminary material layer by a patterning process, and the other part of the preliminary material layer other than the beam splitting structure is formed as the beam splitting film body accordingly.

In the present disclosure, there is no specific limitation on the patterning process of forming the beam splitting structure. In some embodiments, the beam splitting structure may be formed by using a photolithographic process or a transfer process.

In the present disclosure, there is no specific limitation on the structure of the surface light source 110, as long as the surface light source 110 can emit white light. In some embodiments, the surface light source 110 may be a conventional surface light source including a light emitting element, an optical film, and the like.

In some embodiments, as shown in FIG. 2, the surface light source 110 may includes a plurality of organic light-emitting diodes 111 emitting white light, so as to reduce a thickness of the surface light source. In addition to having a small thickness, the surface light source 110 having the plurality of organic light-emitting diodes 111 may also achieve local light adjustment, so that an image displayed on the display apparatus having the backlight 100 according to embodiments of the present disclosure has a better contrast ratio.

Figure 4:
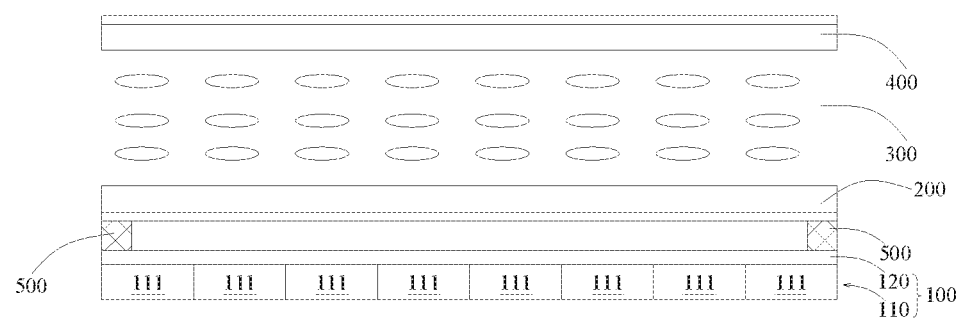
FIG. 4 is a structural diagram of a display apparatus according to an embodiment of the present disclosure.

As another aspect of the present disclosure, there is provided a display apparatus, which has lower power consumption. In some embodiments, as shown in FIG. 4, the display apparatus includes a display panel and a backlight 100 as described above, and the surface of the beam splitting film 120, on which the beam splitting structure is formed, is proximal to the display panel. The display panel is divided into a plurality of pixel units, each of which corresponds to one of the beam splitting unit.

As described above, light beams having different colors exit from the beam splitting unit. Thus, the display apparatus can achieve color display by using the backlight according to embodiments of the present disclosure, and there is no need for arranging a color filter film in the display panel. Moreover, the light beams through the beam splitting film are barely being absorbed by the beam splitting film, so that the brightness of emergent light from the backlight can be improved and the power consumption can be lowered.

In the present disclosure, there is no limitation on the specific structure of the display panel. In some embodiments, as shown in FIG. 4, the display panel is a liquid crystal display panel and includes an array substrate 200, a counter substrate 400, and a liquid crystal layer 300 encapsulated between the array substrate 200 and the counter substrate 400. It should be understood that, a polarizer is attached to a light-entering surface of the array substrate 200, and a polarizer is attached to a light-exiting surface of the counter substrate 400.

Needless to say, the display panel may be any other display panel that requires a backlight for normal display.

In the present disclosure, there is no specific limitation on the connection manner between the backlight 100 and the display panel. In some embodiments, the backlight 100 and the display panel may be fixedly connected by using a front frame.

In some embodiments, the backlight 100 and the display panel may be bonded together by a sealant 500 surrounding the display panel.

In some embodiments, the backlight 100, the display panel and the sealant 500 together form a sealed chamber. As described above, in some embodiments, the backlight 100 may include the plurality of organic light-emitting diodes 111 emitting white light; and external moisture can be prevented from entering a space between the backlight 100 and the display panel by forming the sealed chamber between the backlight 100 and the display panel, so that the corrosion and the oxidation of the organic light-emitting diode 111 due to the moisture can be avoided and thus the service life of the display apparatus can be prolonged.

Figure 5:
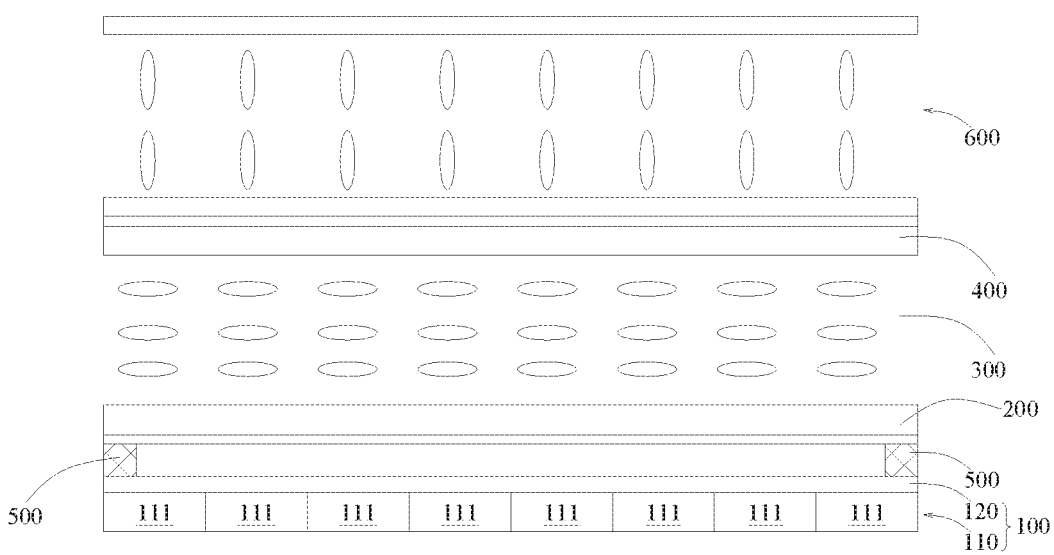
FIG. 5 is another structural diagram of a display apparatus according to an embodiment of the present disclosure.

In some embodiments, as shown in FIG. 5, the display apparatus may further include a viewing angle control panel 600 disposed on a light-exiting side of the display panel. In some embodiments, the viewing angle control panel 600 includes a viewing angle control liquid crystal layer and a control module capable of providing a control voltage to the viewing angle control liquid crystal layer, wherein a refraction index of the viewing angle control liquid crystal layer varies with the change of the control voltage.

The control voltages provided by the viewing angle control panel 600 may generate different electric fields, resulting in different refraction indexes of the viewing angle control liquid crystal layer, which in turn cause the display apparatus to have different viewing angles.

For example, when a user of the display apparatus is viewing a highly classified document, the user may adjust the control voltage to control the refraction index of the viewing angle control liquid crystal layer, so that the display apparatus has a narrow viewing angle, and thus a protective effect is achieved. For another example, when a plurality of persons are viewing an image displayed on the display apparatus together, the control voltage may be adjusted to control the refraction index of the viewing angle control liquid crystal layer, so that the display apparatus has a wide viewing angle to facilitate the viewing of the plurality of persons.

In the present disclosure, there is no specific limitation on the material of the viewing angle control liquid crystal layer. In some embodiments, the viewing angle control liquid crystal layer may include a blue phase liquid crystal. In some embodiments, the viewing angle control liquid crystal layer may include a polymer dispersed liquid crystal (PDLC).

Figure 6:
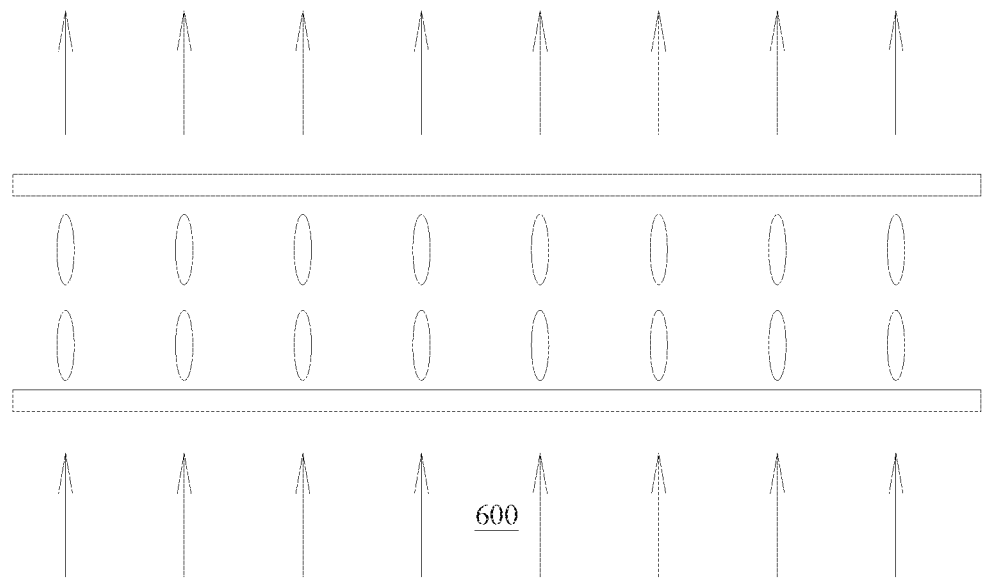
FIG. 6 is a diagram illustrating the operating principle of a viewing angle control panel of the display apparatus of FIG. 5 in a narrow viewing angle mode.

FIG. 6 is a diagram illustrating the operating principle of a viewing angle control panel of the display apparatus of FIG. 5 in a narrow viewing angle mode. When the viewing angle control panel is in the narrow viewing angle mode, the light from the display panel directly passes through the viewing angle control panel, as shown in FIG. 6. In some embodiments, to achieve this mode, a threshold voltage may be applied to the viewing angle control liquid crystal layer, which causes the liquid crystal molecules of the viewing angle control liquid crystal layer to be aligned, such that the viewing angle control panel 600 is in a transmitting state, and thus a narrow viewing angle is obtained.

Figure 7:
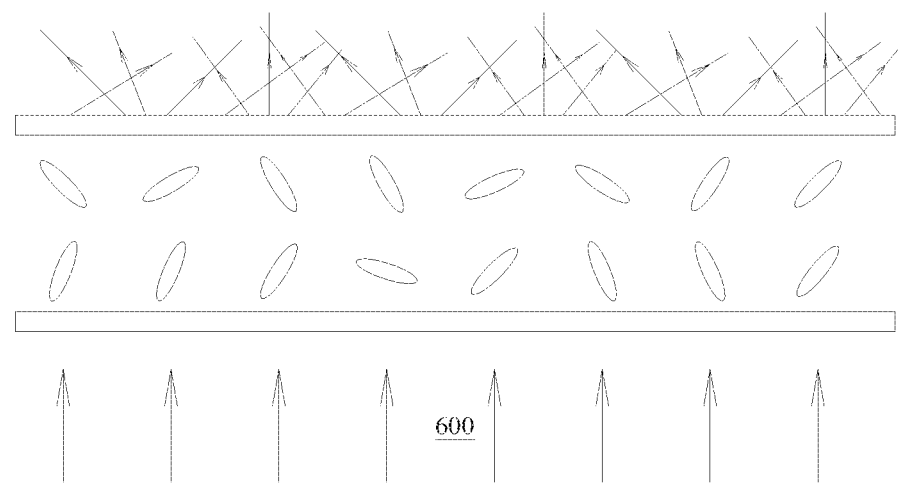
FIG. 7 is a diagram illustrating the operating principle of a viewing angle control panel of the display apparatus of FIG. 5 in a wide viewing angle mode.

FIG. 7 is a diagram illustrating the operating principle of a viewing angle control panel of the display apparatus of FIG. 5 in a wide viewing angle mode. In some embodiments, to achieve this mode, no voltage is applied to the viewing angle control liquid crystal layer, resulting in that the liquid crystal molecules are disorderly distributed in the viewing angle control liquid crystal layer, such that the viewing angle control panel 100 is in a scattering state and thus a wide viewing angle is obtained. Moreover, an image being viewed within this wide viewing angle has a uniform brightness, so that users can have a better viewing experience within this viewing angle.

In some embodiments, when the viewing angle control liquid crystal layer is controlled to be in a transparent state, the control module is capable of providing, to the viewing angle control liquid crystal layer, threshold voltages with opposite polarities at different times. By providing threshold voltages with opposite polarities, the liquid crystal molecules in the viewing angle control liquid crystal layer can rotate 180 degrees at different times, so as to avoid aging of the liquid crystal molecules. Hence, when the threshold voltage is not being applied, the liquid crystal molecules can be returned to a state, in which they are disorderly distributed.

As an example, it is assumed that the threshold voltages for the liquid crystal molecules in the viewing angle control liquid crystal layer are +10 V and −10 V. When the viewing angle control liquid crystal layer is controlled to be in the transparent state, the threshold voltage of +10 V is provided to the viewing angle control liquid crystal layer by the control module during the display of an odd frame image, while the threshold voltage of −10 V is provided to the viewing angle control liquid crystal layer by the control module during the display of an even frame image. The difference between the angle of the liquid crystal molecule during the display of the odd frame image and the angle of the liquid crystal molecule during the display of the even frame image is 180 degrees, and thus aging of the liquid crystal molecules in the viewing angle control liquid crystal layer is avoided. When the threshold voltage is not being applied to the viewing angle control liquid crystal layer by the control module, the liquid crystal molecules in the viewing angle control layer can be rapidly returned to the state in which they are disorderly distributed.

It should be understood that, the foregoing implementations are merely exemplary embodiments for the purpose of explaining the principle of the present invention, but the present invention is not limited thereto. For a person skilled in the art, various modifications and improvements can be made without departing from the spirit and essence of the present invention, and these modifications and improvements also fall within the protection scope of the present invention.

What is claimed is:

1. A backlight, comprising a surface light source and a beam splitting film in a form of a blazed grating provided on a light-exiting surface of the surface light source, wherein
a beam splitting structure is provided on a surface of the beam splitting film distal to the surface light source, and the surface of the beam splitting film distal to the surface light source is divided into a plurality of beam splitting units; and
the beam splitting structure in each of the plurality of beam splitting units is capable of splitting light entering a surface of the beam splitting film proximal to the surface light source into at least three light beams each having a different emergent direction and a different wavelength, wherein
the beam splitting film comprises a beam splitting film body and the beam splitting structure, the beam splitting structure being on a side of the beam splitting film body distal to the surface light source; the beam splitting unit comprises a plurality of beam splitting sub-units, each of which is configured to emit one of red, green and blue light beams away from the surface light source and towards a corresponding sub-pixel of a pixel unit and comprises a plurality of beam splitting elements, and wherein
in a plane perpendicular to the surface light source, a section of each of the plurality of beam splitting elements has a triangular shape and the plurality of beam splitting elements are closely arranged without a gap between any two adjacent ones of the plurality of beam splitting elements,
wherein each of the beam splitting elements comprises a light-exiting inclined plane having an angle with respect to a surface of the beam splitting film body proximal to the surface light source, and the angle satisfies the following equation, $$\lambda = 2d \sin \gamma,$$

where $\lambda$ is a wavelength of light exiting from the light-exiting inclined plane; d is a length of orthogonal projection of the beam splitting element on the surface of the beam splittig film body proximal to the surface light source; and $\gamma$ is the angle between the light-exiting inclined plane and the surface of the beam splitting film body proximal to the surface light source.

2. The backlight according to claim 1, wherein each of the beam splitting units comprises three beam splitting sub-units, red, green and blue light beams exiting from the three beam splitting sub-units, respectively.

3. The backlight according to claim 1, wherein the beam splitting structure and the beam splitting film body are an integral structure obtained by an integral forming process.

4. The backlight according to claim 1, wherein each of the beam splitting elements has at least one dimension on nanometer scale.

5. The backlight according to claim 1, wherein the light-exiting inclined planes of all beam splitting elements in a same beam splitting sub-unit are parallel to each other.

6. The backlight according to claim 1, wherein the surface light source comprises a plurality of organic light-emitting diodes emitting white light.

7. A display apparatus, comprising a display panel and the backlight according to claim 1, wherein
the surface of the beam splitting film on which the beam splitting structure is provided is proximal to the display panel; and
the display panel is divided into a plurality of pixel units, each of the plurality of pixel units corresponding to one of the beam splitting units.

8. The display apparatus according to claim 7, wherein the backlight and the display panel are bonded together by a sealant surrounding the display panel.

9. The display apparatus according to claim 8, wherein the backlight, the display panel and the sealant together form a sealed chamber.

10. The display apparatus according to claim 7, further comprising a viewing angle control panel disposed on a light-exiting side of the display panel, wherein the viewing angle control panel comprises a viewing angle control liquid crystal layer and a control module capable of providing a control voltage to the viewing angle control liquid crystal layer, and a refraction index of the viewing angle control liquid crystal layer varies with change of the control voltage.

11. The display apparatus according to claim 10, wherein the control module is capable of providing a threshold voltage to the viewing angle control liquid crystal layer, such that the viewing angle control liquid crystal layer is in a transparent state.

12. The display apparatus according to claim 11, wherein the control module is configured to, in a case where the viewing angle control liquid crystal layer is controlled to be in a transparent state, provide threshold voltages with opposite polarities to the viewing angle control liquid crystal layer at different times.

13. The display apparatus according to claim 10, wherein the viewing angle control liquid crystal layer comprises a polymer dispersed liquid crystal or a blue phase liquid crystal.

14. The display apparatus according to claim 10, wherein each of the beam splitting units comprises three beam splitting sub-units, red, green and blue light beams exiting from the three beam splitting sub-units, respectively.

15. The display apparatus according to claim 10, wherein the beam splitting structure and the beam splitting film body are an integral structure obtained by an integral forming process.

16. The display apparatus according to claim 10, wherein each of the beam splitting elements has at least one dimension on nanometer scale.

17. The display apparatus according to claim 10, wherein the light-exiting inclined planes of all beam splitting elements in a same beam splitting sub-unit are parallel to each other.

* * * * *